(12) United States Patent
Breslin et al.

(10) Patent No.: US 6,311,954 B1
(45) Date of Patent: *Nov. 6, 2001

(54) TRAILER TONGUE WITH VERTICAL LIFT GEOMETRY

(75) Inventors: Patrick W. Breslin, Peoria; Thomas D. Carney, Mesa; Roderick L. Evans, Glendale, all of AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/724,334

(22) Filed: Nov. 28, 2000

Related U.S. Application Data

(63) Continuation of application No. 09/193,778, filed on Nov. 17, 1998, now Pat. No. 6,176,470.

(51) Int. Cl.[7] ....................................................... B60S 9/14
(52) U.S. Cl. .......................... 254/420; 254/419; 254/424
(58) Field of Search ................................... 254/420, 419, 254/424, 93 H, 101, 122, 121, 97, 85, 123; 269/79; 108/117, 115

(56) References Cited

U.S. PATENT DOCUMENTS

| | | |
|---|---|---|
| 1,359,527 | * 11/1920 | Reed ..................................... 254/126 |
| 2,580,545 | 10/1952 | Hill . |
| 3,020,066 | 2/1962 | Torrey . |
| 3,181,891 | 5/1965 | Moats . |
| 3,281,160 | 10/1966 | Vinther et al. . |
| 3,314,692 | 4/1967 | Karns . |
| 3,319,977 | 5/1967 | Quandt et al. . |
| 3,669,409 | 6/1972 | Eranosian . |
| 3,791,676 | 2/1974 | Spratlen . |
| 3,841,663 | 10/1974 | Proffit . |
| 4,146,250 | * 3/1979 | DeHerder .............................. 254/126 |
| 6,176,470 | * 1/2001 | Breslin et al. ....................... 254/420 |

* cited by examiner

Primary Examiner—Joseph J. Hail, III
Assistant Examiner—Lee Wilson
(74) Attorney, Agent, or Firm—Jeffer, Mangels, Butler & Marmaro LLP

(57) ABSTRACT

A trailer tongue includes a support and a support leg slidingly and pivotally engaged with the support. When the support leg is raised or lowered the trailer tongue moves in a substantially vertical direction. In a preferred embodiment, the trailer tongue includes a rigid strut having first and second ends and a mechanism for extending and retracting the support leg pivotally connect to the support and the support leg. The first end of the rigid strut is pivotally connected to the support leg and the second end is pivotally connected to the support.

11 Claims, 9 Drawing Sheets

TRAILER TONGUE WITH VERTICAL LIFT GEOMETRY

This is a continuation of application Ser. No. 09/193,778, filed on Nov. 17, 1984 now U.S. Pat. No. 6,176,470.

FIELD OF THE INVENTION

The present invention relates to trailer tongues and more particularly to a trailer tongue that affords a substantially reduced horizontal component of movement of the trailer's hitchball coupler.

BACKGROUND OF THE INVENTION

A variety of trailer tongues and devices (generically referred to as jacks) for raising and lowering same are known. The design shown in FIG. 1 is a straight telescoping tubular jack and is very widely known. The telescoping member can be significantly retracted thereby resulting in substantially vertical movement of the trailer's hitchball coupler. However, as shown in FIG. 2, even when fully retracted, the telescoping member 2 hangs below the tongue. This design can be modified so that the telescoping member 2 can be rotated to horizontal position when not in use. One drawback associated with these designs is that bending damage can occur if the jack is not fully retracted and/or rotated to the horizontal position before towing. Damage can result when the telescoping tube or the contact foot, hanging below the tongue, strikes an object, such as a curb, or drags over uneven terrain.

In FIG. 3, another well known design is shown. In this design, a pivoting support leg 4 is used in combination with a screw jack 6 in an attempt to prevent the possible occurrence of bending damage. The pivoting support leg 4 is angled such that it deflects impacts when less than fully retracted. The fixed pivot pin 8 at the forward end of the pivoting leg 4 allows that the jack 6 itself may be pivotally mounted at each of its ends, with the lower end following the pivoting leg 4 through the arc of its vertical movement. This relieves the jack 6 entirely of all bending loads that may otherwise cause damage as described above.

One particular disadvantage of the pivoting leg 4 is that vertical movement of the hitchball coupler 9 follows an arc (designated A1 in FIG. 3), dictated by the length of the pivot leg itself, which includes a significant horizontal component. This is undesirable because of the difficulty it imposes on attachment of the coupler 9 to the towing vehicle hitchball 7. For example, after care is taken to line up the hitchball of the towing vehicle directly under the raised coupler 9, the jack 6 handle is rotated, thereby retracting the pivoting leg 4 and lowering the coupler 9. As it is lowered, due to its arcuate motion, the coupler 9 pitches forward, therefore, often times, requiring additional movement of the towing vehicle or trailer to re-align the hitchball 7 and coupler 9.

A long felt need exists for a device that is less susceptible to bending damage and substantially reduces the horizontal component of movement of the hitchball coupler when being lowered or raised.

SUMMARY OF THE PREFERRED EMBODIMENTS

In accordance with one aspect of the present invention, there is provided a trailer tongue that includes a support and a support leg slidingly and pivotally engaged with the support. When the support leg is raised or lowered the trailer tongue moves in a substantially vertical direction.

In accordance with another aspect of the present invention, there is provided a method of lowering a trailer having a support, a support leg, means for extending and retracting the support leg and a hitchball. The method includes the step of retracting the means for extending and retracting the support leg and pivoting and sliding the support leg relative to the support, such that the hitchball coupler is lowered in a substantially vertical direction.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Prior trailer tongues include devices for raising and lowering same that are either susceptible to bending damage or include a significant component of horizontal movement of the trailer's hitchball coupler when being raised or lowered (see above). Described herein is a novel device and method for raising and lowering a trailer tongue with a substantially reduced horizontal component of movement, thereby providing movement of the trailer tongue in a substantially vertical direction.

Figure 1:
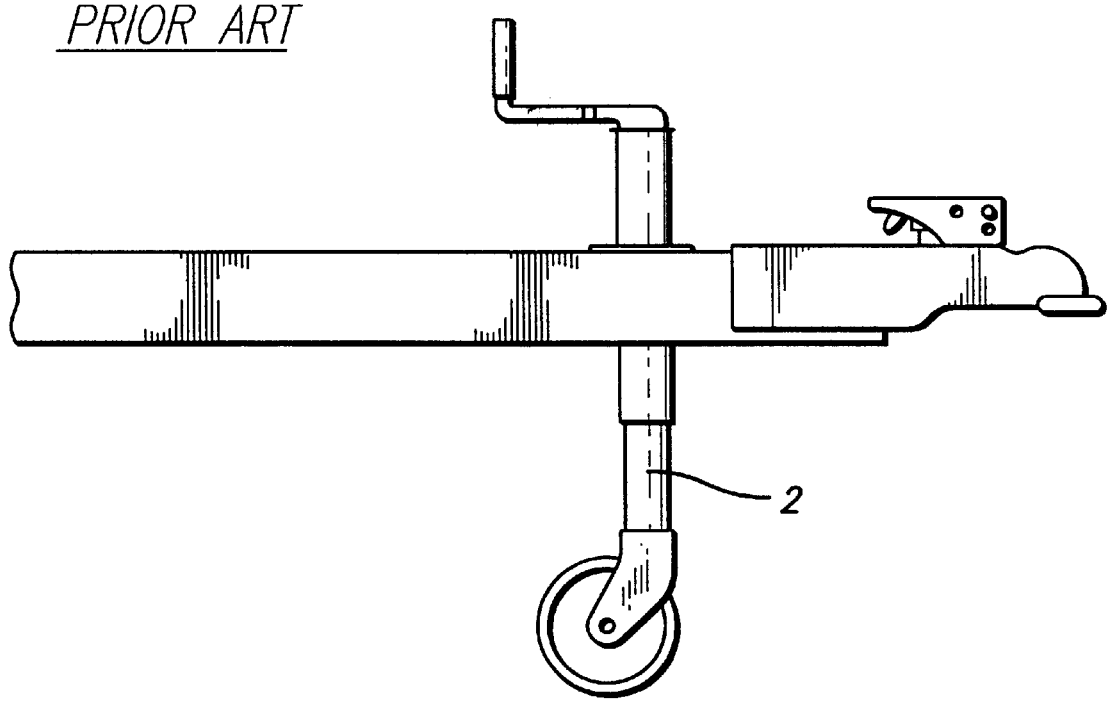
FIG. 1 is a side elevation of a prior art trailer tongue jack mounted on a trailer tongue.
Figure 2:
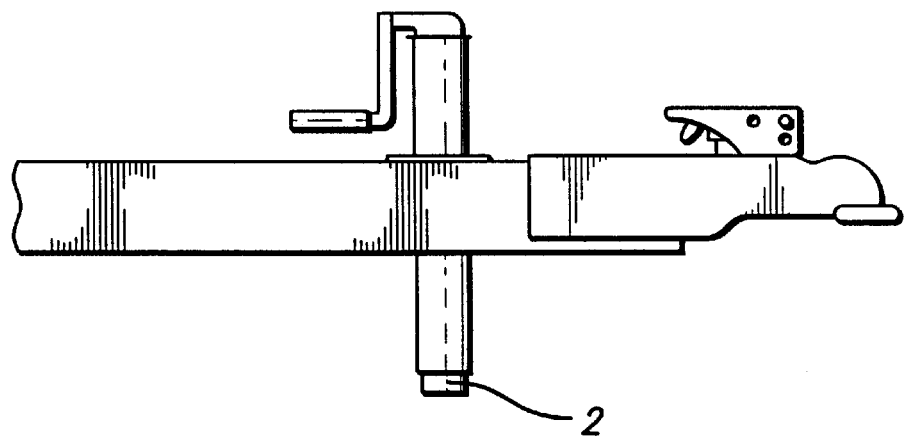
FIG. 2 is the prior art trailer tongue jack of FIG. 1 in a fully retracted position.
Figure 3:
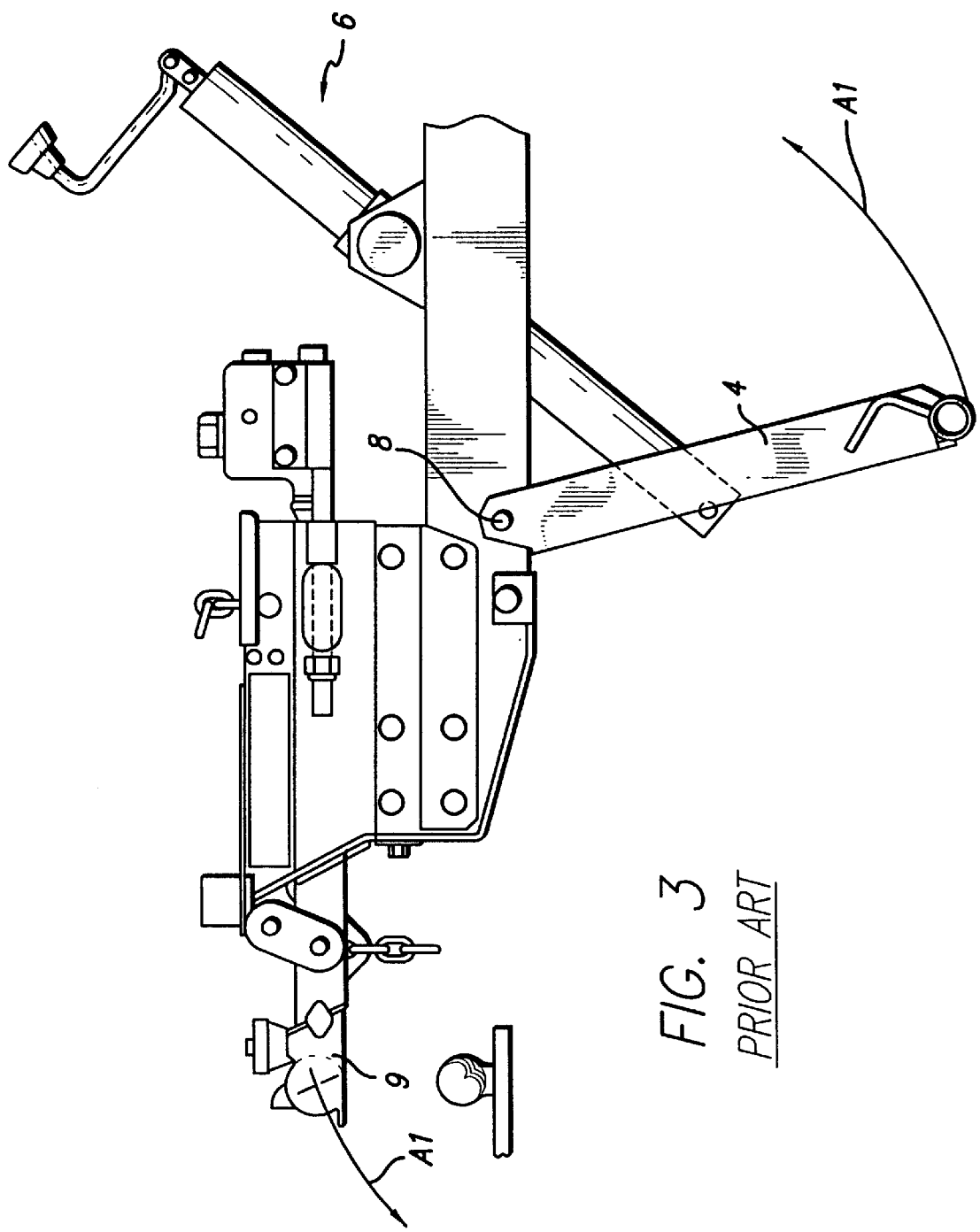
FIG. 3 is a side elevation of a trailer tongue including a prior art trailer tongue jack assembly.
Figure 4C:
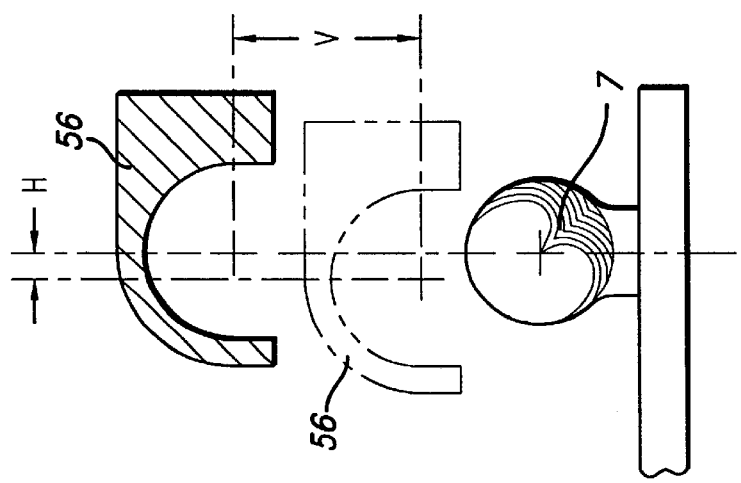
FIGS. 4a–c are a series of side elevations showing a hitchball coupler being lowered onto a hitchball with each figure showing a different horizontal component of movement of the hitchball coupler.
Figure 4B:
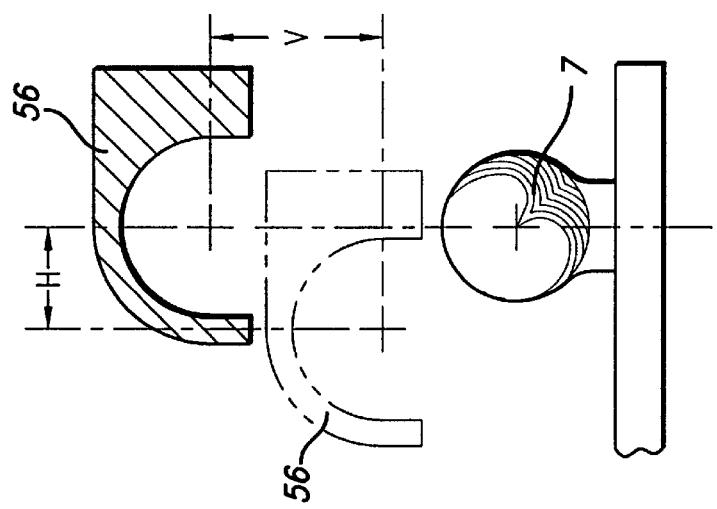
Figure 4A:
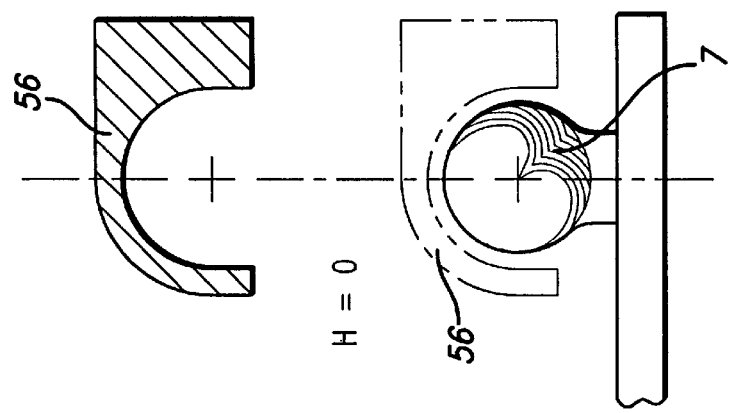

Generally, substantially vertical movement means that when a hitchball coupler is lowered onto a hitchball it is not necessary to move the towing vehicle and/or trailer to realign the hitchball coupler with the hitchball. Preferably, and with reference to FIGS. 4a–4c, substantially vertical movement means that when a hitchball coupler 56 is lowered approximately 4.0" (an average distance a typical operator lowers a hitchball coupler to engage a hitchball) onto a hitchball 7, the horizontal component of movement H will be small enough that the hitchball coupler will mate with the hitchball 7 and the towing vehicle and/or the trailer will not need to be moved to realign the hitchball coupler 56 with the hitchball 7. If H is too large, as shown in FIG. 4b, there is not substantial vertical movement since the towing vehicle and/or trailer must be moved for realignment. In general, for every 4" of vertical movement V, the horizontal component of movement H is no more than about 1"; preferably, for every 4" of vertical movement V, the horizontal component of movement H is no more than about ½", and most preferably, for every 4" of vertical movement V, the horizontal component of movement H is no more than about ¼". FIG. 4a illustrates an example wherein H=O; FIG. 4b illustrates an example wherein H is too large; and FIG. 4c illustrates an example wherein H is within the preferable range.

Referring to FIGS. 5–9, the trailer tongue 10 includes a support 11, support leg or elongated member 12 that pivotally and slidingly engages the support 11, and a rigid strut 16 pivotably connected thereto. It should be understood that trailer tongues are well known and any elongated member that slidingly and pivotally engages a support and is pivotally connected to a rigid strut is within the scope of the present invention.

In a preferred embodiment, elongated member 12 includes; opposed first and second side members 18a and 18b. A pair of elongated slots 14 are preferably defined in the opposing side members 18a and 18b, such that the elongated slots 14 are in opposed relation. Also, defined in at least one of the first and second sidemembers 18a and 18b is an opening 20. In a preferred embodiment an opening 20 is defined in first side member 18a.

Figure 8:
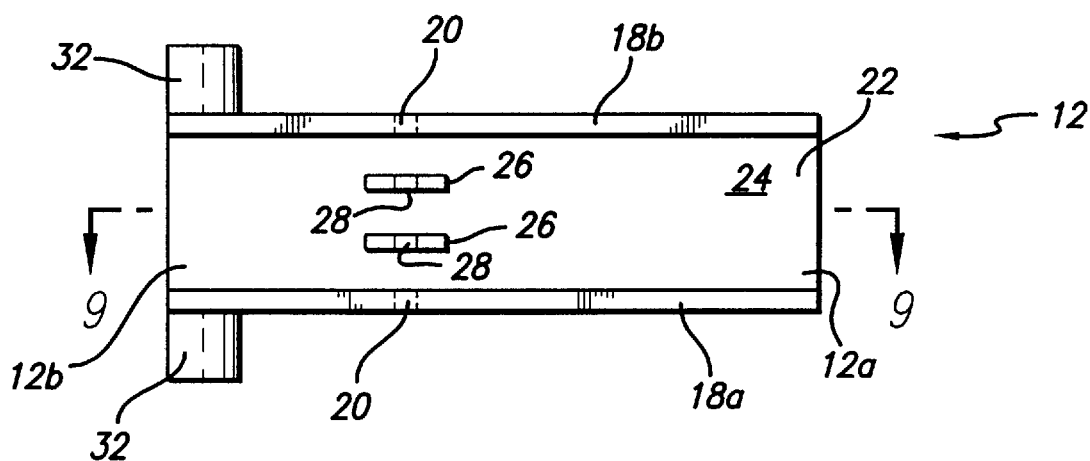
FIG. 8 is a top plan view of the elongated member of FIG. 5.
Figure 9:
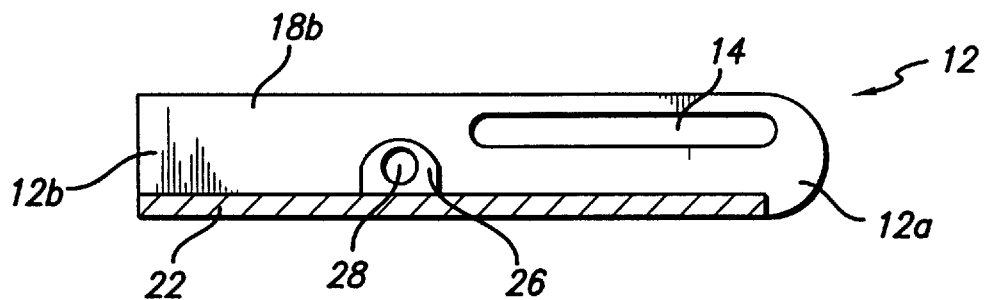
FIG. 9 is a sectional side elevation of the elongated member of FIG. 5 showing a mounting bracket thereon.

Preferably, the first and second side members 18a and 18b are connected by an elongated wall 22. However, any means for holding the first and second side members 18a and 18b in opposed relation is within the scope of the present invention. For example, first and second side members 18a and 18b can be connected by one or more rods or bars. The wall 22 and the side members 18a and 18b define a channel 24, as shown in FIG. 8.

Attached to the wall 22, in the channel 24 is a plurality of mounting brackets 26 that are in fixed spatial relation. The mounting brackets 26 each have an opening 28 defined therein. The openings 28 of the mounting brackets 26 are axially aligned. Preferably, the openings 28 of the mounting brackets 26 are in axial alignment with the opening 20 in first side member 18a, such that a pivot pin 30 or the like can extend through the opening 20 in first side member 18a and through the openings 28 of all of the mounting brackets 26.

The elongated member 12 can include support feet, such as the tubular support feet 32 shown in the Figures. However, it should be understood that the support feet are not a limitation on the present invention. For example, the elongated member 12 can include a substantially flat rigidly or pivotally connected support foot.

The elongated member 12 is pivotally connected to the support 11, or other object to be supported, by a pivot pin 31 or the like. Pivot pin 31 extends through the opposed elongated slots 14 and through a corresponding opening defined in the support 11. Pivot pin 31 is secured by a cotter pin or the like.

Figure 11:
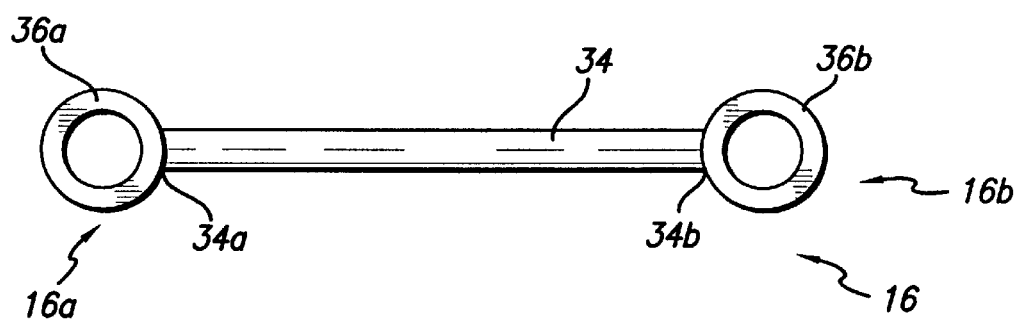
FIG. 11 is a side elevation of the rigid strut of FIG. 5.

Referring to FIG. 11, the rigid strut 16 preferably includes an elongated portion 34 having first and second ends 34a and 34b. Preferably, bushings 36a and 36b are respectively connected to first and second ends 34a and 34b of the elongated portion. Preferably, the elongated portion 34 is circular in cross-section. However, it should be understood that the elongated portion 34 can have a cross-section of any geometric shape, for example, square, rectangular, triangular, etc. The bushings 36a and 36b are preferably welded to first and second ends 34a and 34b of the elongated portion 34. However, the elongated portion 34 and the bushings 36a and 36b can be one continuous unit. Preferably, the rigid strut 16 is comprised of a rigid material, such as steel.

Figure 10:
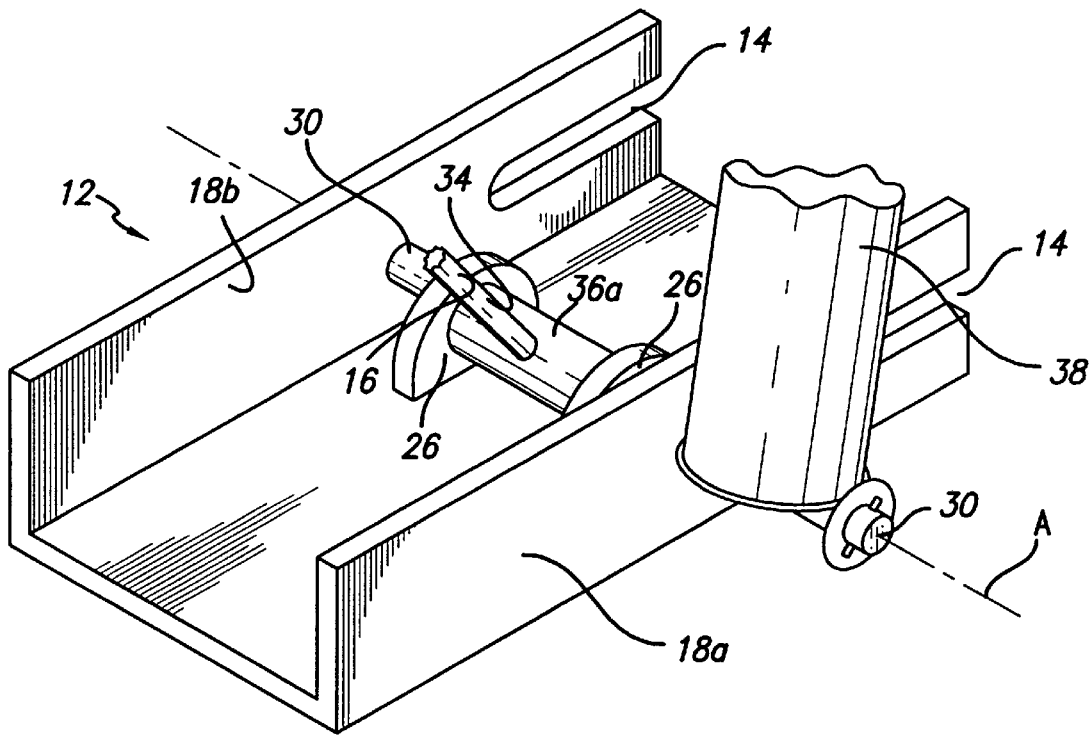
FIG. 10 is a perspective of the elongated member having the jack and the strut pivotally connected thereto via a pivot axle.

Referring to FIG. 10, rigid strut 16 has first and second ends 16a and 16b. Bushing 36a of the elongated member 16 is positioned between the mounting brackets 26 such that bushing 36a and the openings 28 and 20 are substantially axially aligned. The pivot pin 30 is slipped through the openings 28 and 20 and the opening in the bushing 36, thereby pivotally connecting first end 16a of the rigid strut 16 to the elongated member 12. Preferably, the pivotal connection of the rigid strut 16 to the elongated member 12 is at a point intermediate the first and second ends 12a and 12b of the elongated member 12.

Preferably, the pivot pin 30 extends a predetermined distance outside of side member 18a. Means for extending and retracting the elongated member 12, referred to herein as extending and retracting means 38, for example, a screw jack as shown in the Figures, are connected to the pivot pin 30, such that they are pivotally connected to the elongated member 12. For example, the rigid strut 16 and the extending and retracting means 38 can be pivotally connected to the elongated member 12 along a common lateral axis A. The end of the pivot pin 30 is secured by a washer 40 and cotter pin 42, as shown in FIG. 10, or by other conventional method of securing the pivot pin 30. The means for extending and retracting the elongated member 12 can alternatively be a hydraulic jack, screw jack or any type of jack known in the art.

Figure 5:
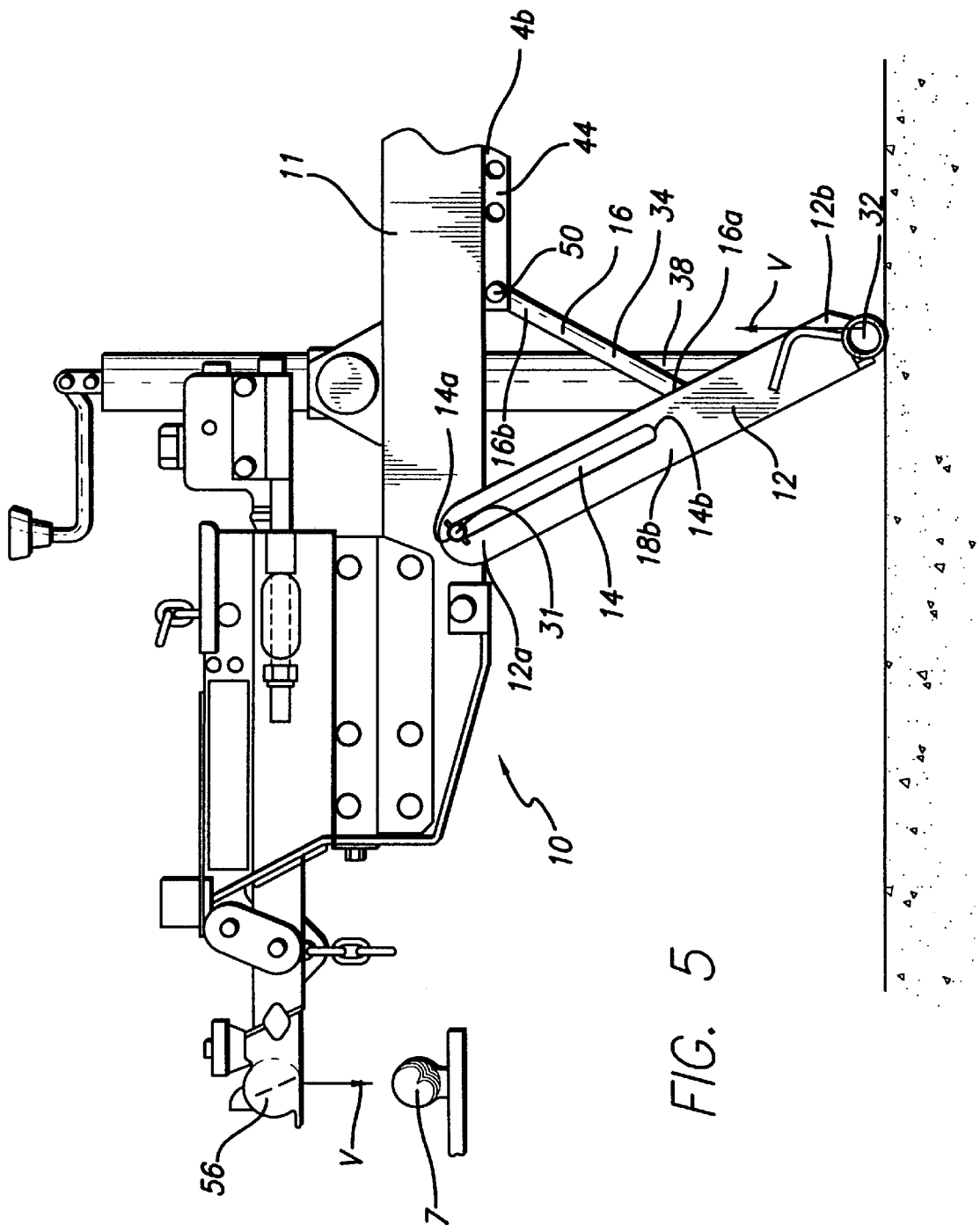
FIG. 5 is a side elevation of a trailer tongue including a support structure having a slotted elongated member and a rigid strut pivotally connected thereto, in accordance with a first embodiment of the present invention.
Figure 6:
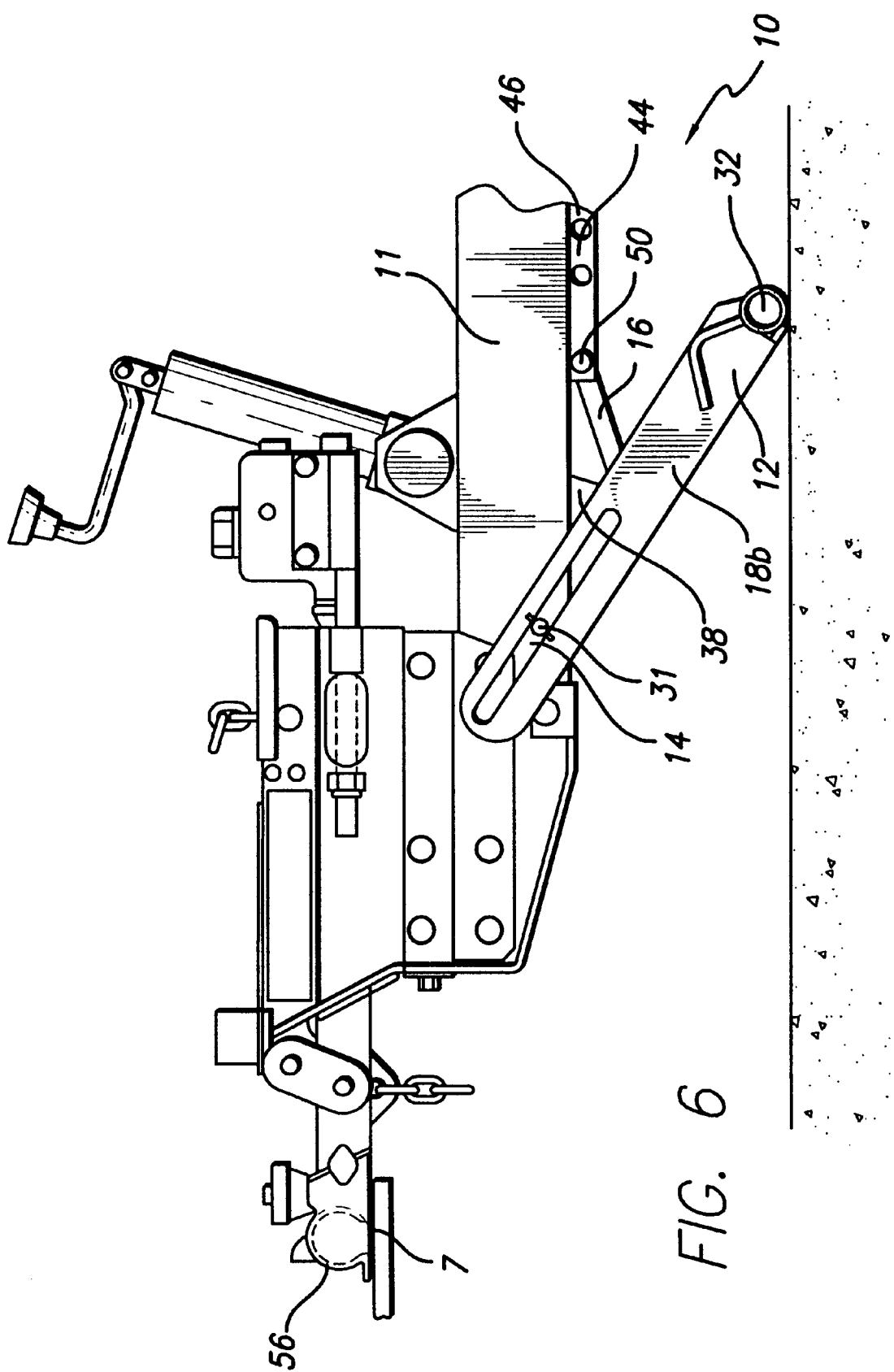
FIG. 6 is a side elevation similar to FIG. 5 showing the elongated member in a semi-retracted position.
Figure 7:
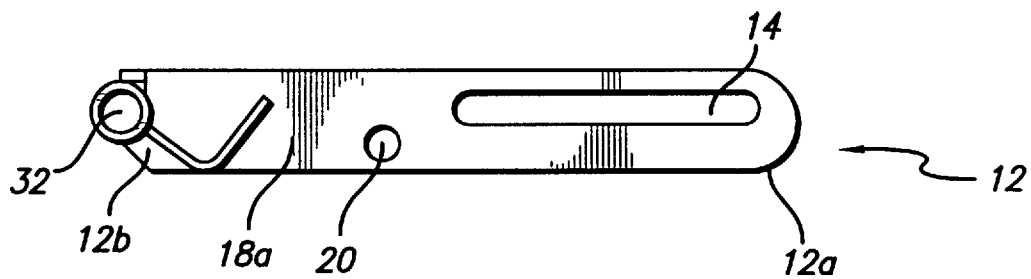
FIG. 7 is a side elevation of an elongated member having a slot defined therein.

As shown in FIGS. 5 and 6, the extending and retracting means 38 is preferably pivotally connected to the support 11, as known in the art.

Figure 12:
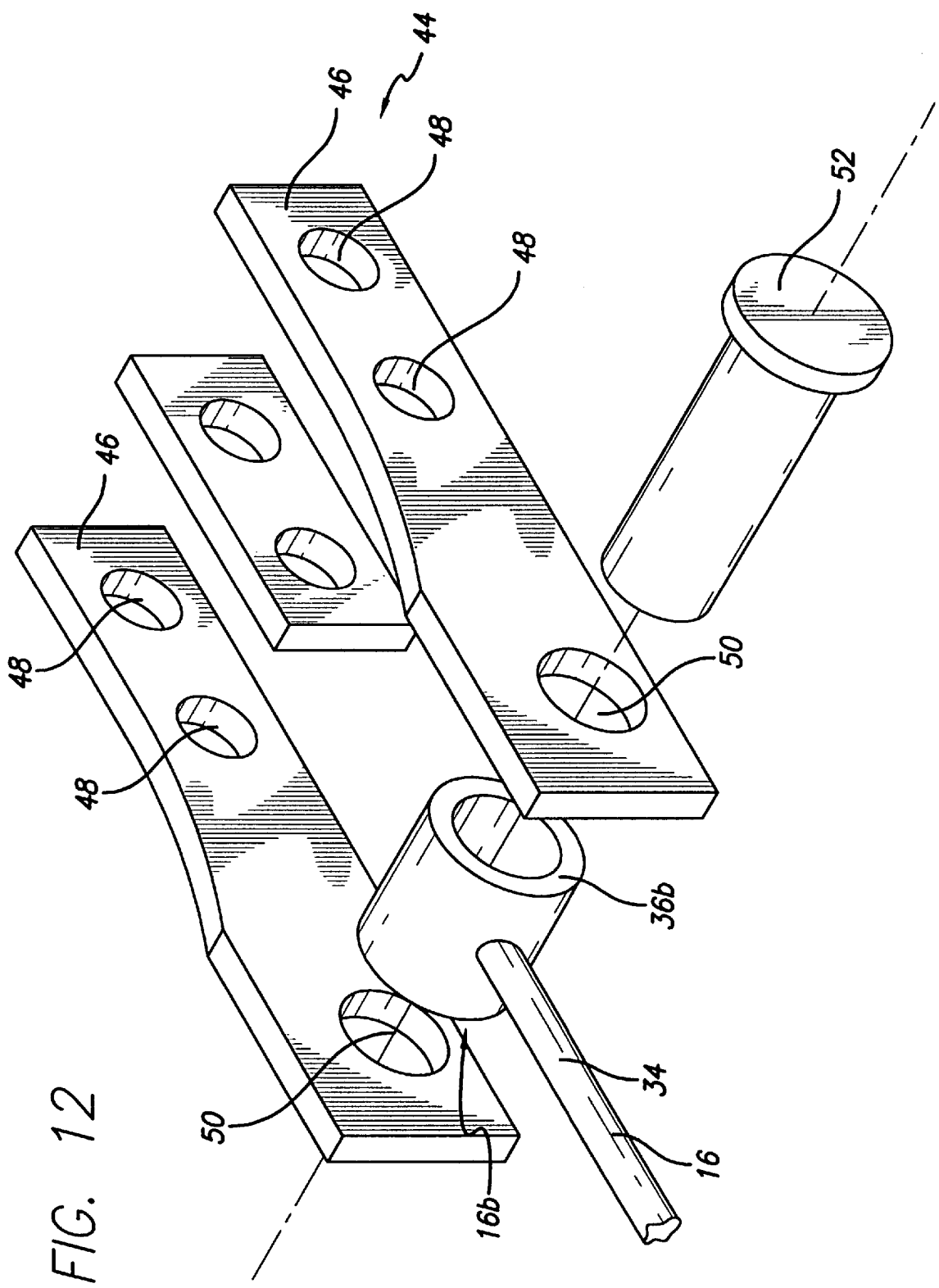
FIG. 12 is an exploded view of the mounting bracket assembly for pivotally connecting the rigid strut to the support.

Referring to FIG. 12, second end 16a of rigid strut 16 is preferably pivotally connected to the support 11, or other structure to be supported. In a particular embodiment, a mounting bracket 44 may be necessary to make the pivotal connection of the rigid strut 16 to the support 11. In a preferred embodiment, the mounting bracket 44 includes a pair of bracket members 46 having defined therein a plurality of securing holes 48, and a connection hole 50. The mounting bracket 40 is secured to the support 11 by aligning the securing holes with corresponding holes in a portion of the support 11 and slipping bolts or the like through the securing holes 48. The bolts are secured using nuts or the like.

To provide the pivotal connection of the rigid strut 16 to the support 11, bushing 36b is axially aligned with connection holes 50 in the bracket portions 46. A pivot pin 52 is slipped through the connection holes 50 and the opening in bushing 36a. The pivot pin 50 is secured in place using a cotter pin or the like. A spacer 54 with predetermined dimensions can be used to provide a more desirable fit between the bracket members 46 and the portion of the support 11 to which the mounting bracket 40 is connected, as shown in FIG. 12.

Referring to FIGS. 5–6, in operation, as the extending and retracting means 38 are retracted, the elongated member 12 pivots about pivot pin 50 in an upward direction. Simultaneously, the fixed length of rigid strut 16 causes the elongated member 12 to slide along elongated slot 14 relative to pivot pin 31. Preferably, when the extending and retracting means 38 are fully extended the pivot pin 31 is positioned at the first end 14a of the elongated slot 14, and when the extending and retracting means 38 are fully retracted, the pivot pin 31 is positioned at the second end 14b of the elongated slot 14. In a preferred embodiment, the length of the rigid strut 16, and the length of the elongated slot(s) 14 are predetermined, such that upon extension or retraction of the extending and retracting means 38 the hitchball coupler 56 moves in a substantially vertical direction with virtually no horizontal component of movement, as shown by arrows V in FIG. 5. Therefore, when the coupler 56 is positioned above a hitchball 7 and subsequently lowered, as described above, the coupler is lowered directly onto the hitchball 7.

Figure 13:
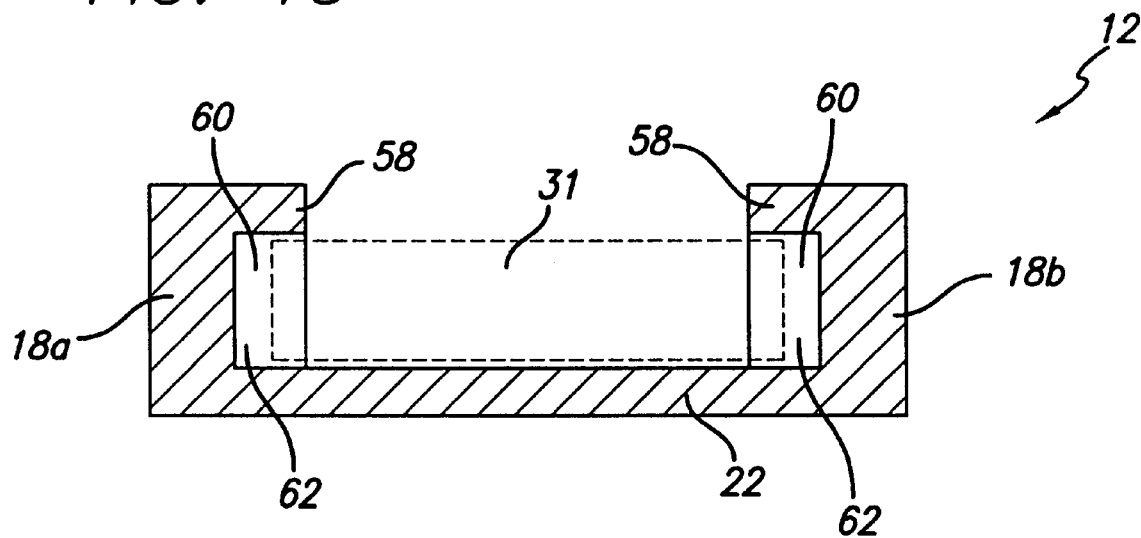
FIG. 13 is a sectional plan view taken along line 13—13 of FIG. 14 of an elongated member having a pair of opposing channels defined therein, in accordance with an alternative embodiment of the present invention.
Figure 14:
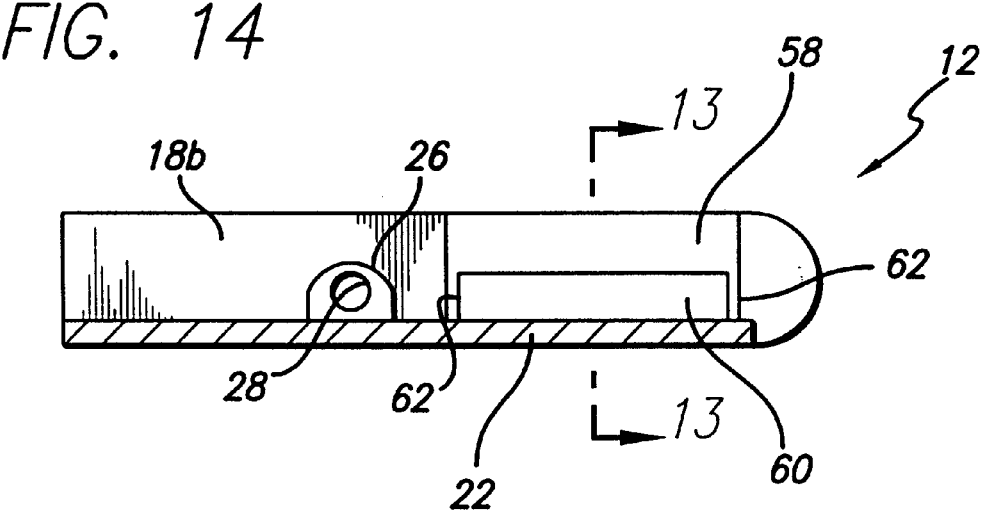
FIG. 14 is a sectional side elevation of the elongated member of FIG. 13.

FIGS. 13 and 14 illustrate an alternative embodiment of elongated member 12 for slidingly and pivotally engaging structure 11. In this embodiment, the opposing side members 18a and 18b of the elongated member 12 include a pair of inwardly directed flanges 58. The inwardly directed flanges 58 and wall 22 define a pair of opposed channels 58 therebetween, in which pivot pin 31 is received. The elongated member 12 preferably includes a pair of stops 62 extending downwardly from flange 58 that define the end of channel 60, as shown in FIG. 14.

In operation, the elongated member 12 pivots and slides relative to pivot pin 31 as described above, however pivot pin 31 travels within opposing channels 60 instead of opposing elongated slots 14.

What is claimed is:

1. An apparatus comprising:
   a) a support,
   b) a jack connected to said support,
   c) a support leg having a longitudinal axis, said support leg being connected to said support at a connection point, and said support leg being connected to said jack at a point remote from said support,
   wherein said support leg translates along its longitudinal axis relative to said connection point.

2. The apparatus of claim 1 wherein said jack is pivotally connected to said support.

3. The apparatus of claim 1 wherein said connection point comprises a pin connecting said support leg to said support.

4. The apparatus of claim 1 further comprising an arm extending between and connecting said support and said support leg.

5. The apparatus of claim 4 wherein said support leg defines a lateral axis, and wherein said arm and said jack are pivotally connected to said support leg along said lateral axis.

6. The apparatus of claim 1 wherein said support leg has at least one elongated slot defined therein.

7. The apparatus of claim 6 wherein said support leg has a pair of opposing elongated slots defined therein.

8. A trailer comprising:
   a) a trailer body,
   b) a tongue extending forwardly from said trailer body,
   c) a support leg having a longitudinal axis, wherein said support leg is slidingly connected to said tongue,
   d) a jack connected to said tongue and said support,
   wherein said support leg is adapted to translate along said longitudinal axis relative to said support.

9. The trailer of claim 8 further comprising an arm extending between and connecting said support and said support leg.

10. The apparatus of claim 9 wherein said support leg defines a lateral axis, and wherein said arm and said jack are pivotally connected to said support leg along said lateral axis.

11. A method of lowering an assembly, said method comprising the steps of:
   (a) retracting a jack, and
   (b) simultaneously sliding and pivoting a support leg relative to a support, wherein said support has a longitudinal axis, wherein said jack is pivotally connected to said support leg at a point remote from said longitudinal axis, and wherein said support leg translates along its longitudinal axis and said support is lowered in a substantially vertical direction.

* * * * *